United States Patent
Hildebrand

(10) Patent No.: US 6,468,465 B1
(45) Date of Patent: Oct. 22, 2002

(54) PLASTIC INJECTION MOLDING WITH REDUCED DIMENSIONAL VARIATIONS USING GAS PRESSURE AND SECONDARY PLASTIC INJECTION

(75) Inventor: Robert E. Hildebrand, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/550,530

(22) Filed: Apr. 17, 2000

Related U.S. Application Data

(60) Provisional application No. 60/156,220, filed on Sep. 27, 1999.

(51) Int. Cl.[7] .......................... B29C 49/22; F16H 35/00
(52) U.S. Cl. ......................... 264/513; 264/572; 74/640
(58) Field of Search ............................. 264/513, 572; 74/640

(56) References Cited

U.S. PATENT DOCUMENTS

| | | | |
|---|---|---|---|
| 5,118,455 A | 6/1992 | Loren | 264/40.3 |
| 5,151,278 A | 9/1992 | Baxi et al. | 425/130 |
| 5,501,120 A * | 3/1996 | Kikuchi et al. | 16/441 |
| 5,639,405 A | 6/1997 | Erikson | 264/40.3 |
| 5,707,659 A | 1/1998 | Erikson | 425/130 |
| 5,753,174 A * | 5/1998 | Shimizu et al. | 264/513 |
| 6,253,047 B1 | 6/2001 | Hildebrand et al. | |
| 6,289,586 B1 | 9/2001 | Casella et al. | |

* cited by examiner

*Primary Examiner*—Suzanne E. McDowell

(57) ABSTRACT

In a method of plastic injection molding of plastic parts with a critical external dimensional accuracy, in particular plastic gears, the plastic molding material is first injected into the mold, and then gas is injected under pressure into the mold to reduce shrinkage of the plastic material away from the mold surface, forming a gas bubble in the plastic molding material in the mold. Then after cooling of that first injected plastic, a separate, secondary injection of more of the same plastic material under pressure into the gas bubble, in the mold (before removing the plastic part from the mold), provides increased strength and a uniform rotational moment of inertia of the gear.

5 Claims, 1 Drawing Sheet

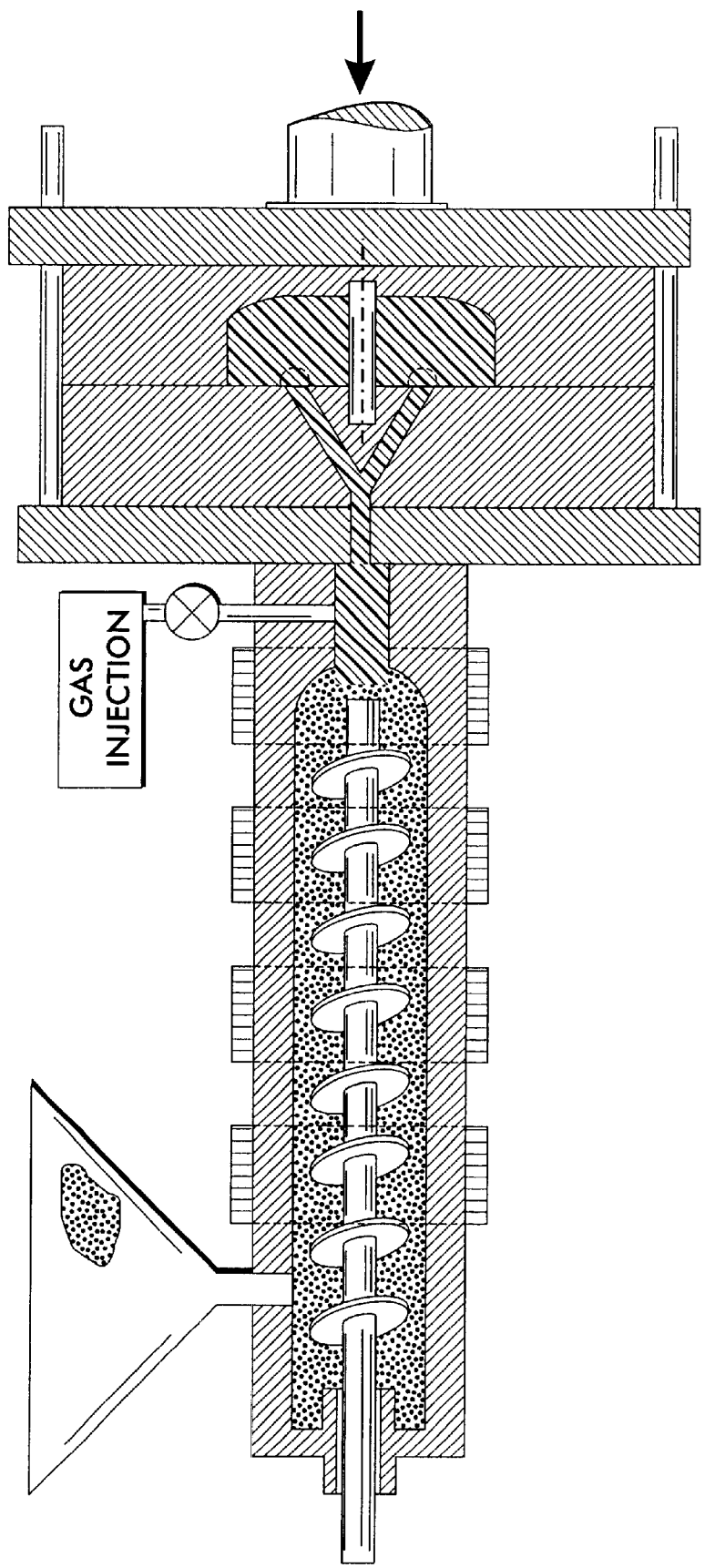

PLASTIC INJECTION MOLDING WITH REDUCED DIMENSIONAL VARIATIONS USING GAS PRESSURE AND SECONDARY PLASTIC INJECTION

Priority is claimed from Provisional Application No. 60/156,220; filed Sep. 27, 1999, by the same assignee and inventor.

Disclosed herein is an improved method of plastic injection molding of plastic parts with a critical external dimensional accuracy, including plastic gears, wherein a plastic molding material is first injected into a mold, and wherein then gas is injected under pressure into the mold to reduce shrinkage of the plastic material away from the mold surface, forming a gas bubble in said plastic molding material in said mold, the improvement comprising the further step of injecting a plastic molding material under pressure into said gas bubble in said plastic molding material in said mold before removing said plastic molding material from said mold.

By way of background, in known molding methods, including plastic molding by screw injection, the screw injector can continue to supply additional plastic under pressure into the mold cavity to keep it filled as the plastic material cools and solidifies. However, once a certain thickness of the outer surfaces of the material being molded solidifies (the material contacting the mold surface normally solidifies first) the additionally injected plastic is often insufficient to keep the material from shrinking away slightly from the mold cavity surface during further cooling. Thus, the finished molded part does not fully conform to the mold dimensions.

It is known that this problem can be overcome by injecting a gas, with sufficient pressure (rather than further mold material) into the interior or central portion of the mold as the material cools. There is documented research on such plastic injection molding assisted by pressurized gas injection for reducing dimensional variations in molded parts. It can improve maintaining conformity of the molded part exterior surfaces to the interior surfaces of the mold by reducing the shrinkage the exterior of the molded part away from the mold surface during cooling. For practical reasons in the technology, a higher pressure can be obtained with injected gas than with the injected plastic. Some examples of U.S. patents on plastic injection molding which is gas assisted (which patents also teach examples of control systems for regulating the timing and flow of the gas with respect to the plastic) are: U.S. pat. No. 5,707,659—"Flow front control system for a gas assisted plastic injection molding apparatus";U.S. Pat. No. 5,639,405—"Method for providing selective control of a gas assisted plastic injection apparatus"; and U.S. Pat. No. 5,151,278—"Plastic injection molding nozzle with gas assist". In view of these and other references cited therein there is no need to re-describe herein in any detail to those skilled in the art suitable such gas assisted plastic injection molding for increasing of the interior pressure to reduce shrinkage.

Gas assist is typically a delayed injection process through its own set of drafts into the mold. Suitable gas injection plastic molding may be done as follows. (This is merely an example.) The mold material, in liquid form, is injected into the mold. Upon cooling the material tends to retract from the mold surface toward either the center of the part, or back into the draft columns. Thus, immediately after the material injection ends, i.e., before any shrinkage can occur, a gas is injected into the mold at a higher pressure than the material injection pressure. This gas forces its way in along a path of least resistance forming a gas bubble inside the material. Thus, the bubble tends to stay in the approximate center of the part, away from rigid bodies such as the mold walls. However, the bubble is not uniform or concentric. Variations in part thickness may also affect the spreading of the gas bubble. The gas is held under pressure in the mold until the plastic material has cooled. The result is that the gas will have exerted enough pressure from the inside of the part that so the shrinkage on the outside of the part will be nearly non-existent. This means that a perfect mold can provide a near perfectly conforming gear or other dimensionally critical molded part.

With such gas assisted plastic injection molding the compressed density of the gas, hence the much higher pressure it dispenses, does increase the accuracy of the molding process. However, there is a disadvantage in doing so. Namely, the relative strength of the part is reduced, due to a hollow central area formed by a gas bubble.

This problem is particular acute for molded parts with critical dimensions, especially, plastic gears. Molding the outside dimensions of a plastic gear more accurately can significantly increase the motion and transmission quality of the gears through mesh (as they rotate). However, prior gas assisted molding has heretofore not been useful for plastic gear production. The gas bubble inside the molded gear significantly reduces the strength and life of the gear. Also, since the bubble varies in position and size, it causes an undesirable variability in the rotational moment of inertia of the gear, similar to gear runnout.

Thus, a specific feature of the specific embodiment disclosed herein is to provide in a method of plastic injection molding of plastic parts with a critical external dimensional accuracy, including plastic gears, wherein a plastic molding material is first injected into a mold, and wherein then gas is injected under pressure into the mold to reduce shrinkage of the plastic material away from the mold surface, forming a gas bubble in said plastic molding material in said mold, the improvement comprising the further step of injecting a plastic molding material under pressure into said gas bubble in said plastic molding material in said mold before removing said plastic molding material from said mold.

Further specific features disclosed herein, individually or in combination, include those wherein said further step of injecting a plastic molding material under pressure into said gas bubble utilizes the same said plastic molding material first injected into said mold; and/or wherein said further step of injecting a plastic molding material under pressure into said gas bubble in said plastic molding material in said mold before removing said plastic molding material from said mold is performed after said first injected plastic molding material has substantially hardened in said mold.

The FIGURE schematically illustrates an otherwise conventional said plastic gas injection molding process, with a dashed outline in the molded part illustrating the disclosed secondary injection has having filed the initial gas bubble in a gear being plastic molded.

As will be described in the embodiment herein, this problem may be overcome by a subsequent third operation or step, in which the gas bubble is filled with a suitable permanent material. The replacement of the gas generated void with a suitable material is done in a way that does not compromise the benefits of the gas injection step, but prevents the strength reduction. This third step is taking a gas assisted part with a hollow center space and performing an operation to fill that hollow space with a secondary material fill, so as to increase the overall part strength, retain the benefit of the original molded part strength, yet not have a loss of the outer dimensional variation control.

This secondary material injection may be injected into the mold under the same or higher pressure. (With sufficient pressure, it may be possible in some cases to not utilize the gas pressure injection step.) The secondary injection is preferably while the part is still in the mold, to avoid deformation, even though this requires slightly more mold time. It is important to note that when using the gas assist method, the first or original mold material may solidify prior to the second injection of the second material. In fact, that appears to be desirable.

It is desirable for the secondary injected material to be the same as the first injected material or at least in the same family of plastics, e.g., Celcon M25. The suitable material for this third step will, of course, depend heavily on the original material being injected into the mold. However, the material selection for this process will desirably follow the following guidelines. First it must have similar properties to appropriate injection molded plastic materials, which are well known. It should be a material suitable for use in the same known molding machines as the original material, and should also be chemically compatible with the original material. Further, reinforcement of the plastic, e.g. glass or carbon fiber fill, must be used with care, as the abrasive properties of glass fibers can rupture the connection between the two materials.

If the first and second plastic injection step materials are compatible, preferably by being identical materials, the hot liquid plastic of the second injection will partially melt the already cooled plastic of the gas bubble surface from the first injection, providing good adhesion when both sets of materials solidify.

The disclosed system may be operated and controlled by appropriate operation of conventional plastic molding control systems and machines, which thus need not be illustrated herein. Nor is the disclosed system limited to any particular mold or part shape.

It will be appreciated that, such components are known per se in various apparatus which may be used herein, including those from art cited herein. All references cited in this specification, and their references, are incorporated by reference herein where appropriate for appropriate teachings of additional or alternative details, features, and/or technical background. What is well known to those skilled in the art need not be described here.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a method of plastic injection molding of plastic parts with a critical external dimensional accuracy, including plastic gears, wherein a plastic molding material is first injected into a mold, and wherein then gas is injected under pressure into the mold to reduce shrinkage of the plastic material away from the mold surface, forming a gas bubble in said plastic molding material in said mold, the improvement comprising the further step of injecting a plastic molding material under pressure into said gas bubble in said plastic molding material in said mold before removing said plastic molding material from said mold.

2. The method of plastic injection molding of plastic parts with a critical external dimensional accuracy of claim 1, wherein said further step of injecting a plastic molding material under pressure into said gas bubble utilizes the same said plastic molding material first injected into said mold.

3. The method of plastic injection molding of plastic parts with a critical external dimensional accuracy of claim 1, wherein said further step of injecting a plastic molding material under pressure into said gas bubble in said plastic molding material in said mold before removing said plastic molding material from said mold is performed after said first injected plastic molding material has substantially hardened in said mold.

4. The method of plastic injection molding of plastic parts with a critical external dimensional accuracy of claim 3, wherein said further step of injecting a plastic molding material under pressure into said gas bubble utilizes the same said plastic molding material first injected into said mold.

5. The method of plastic injection molding of plastic parts with a critical external dimensional accuracy of claim 3, wherein said plastic part is a gear, and said further step provides rotational moment of inertia consistency of said gear irrespective of the position of said gas bubble.

* * * * *